UNITED STATES PATENT OFFICE.

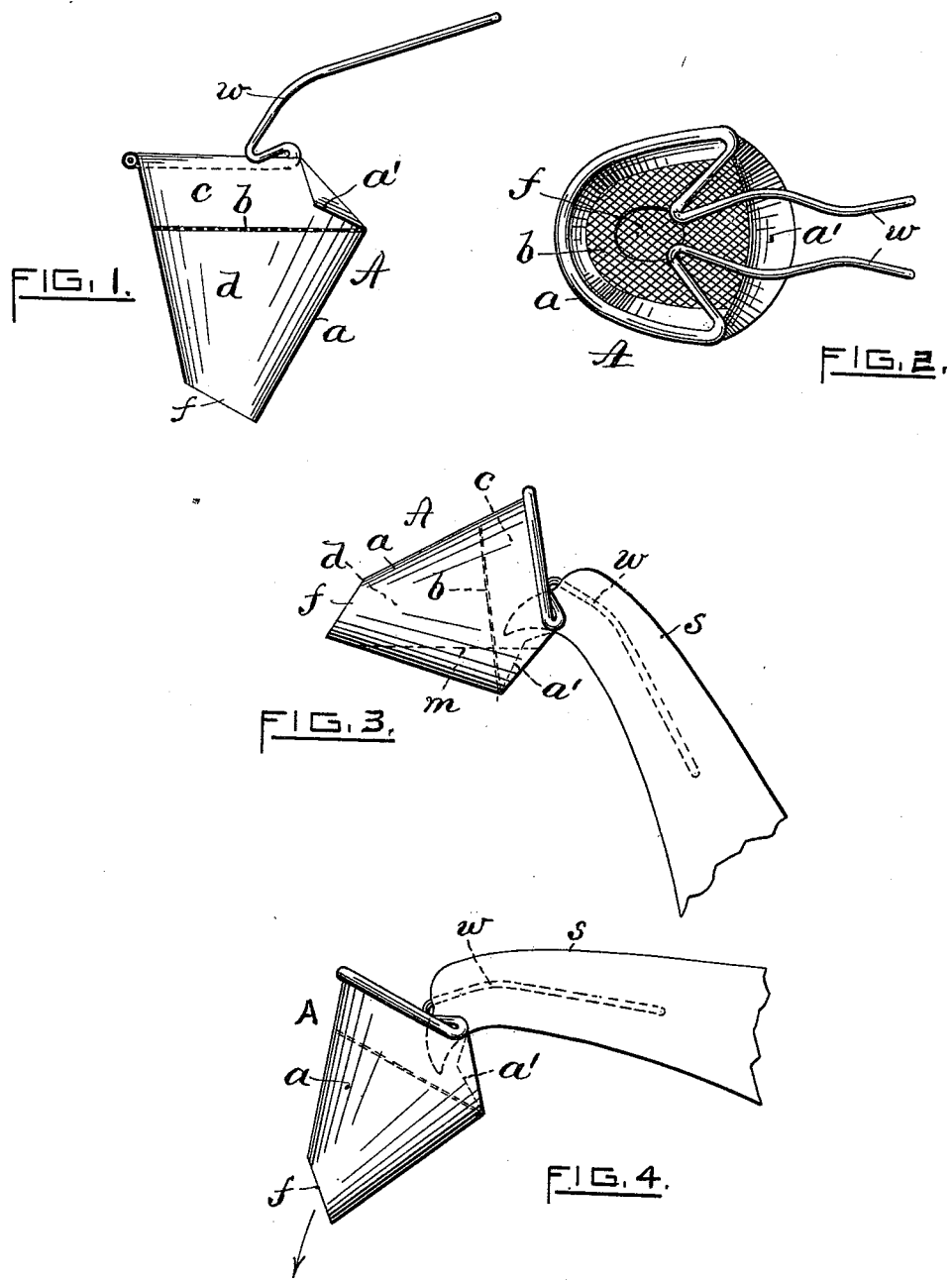

FRANK P. BOLAND, OF PROVIDENCE, RHODE ISLAND.

DETACHABLE DRIPLESS STRAINER FOR TEA OR COFFEE POTS.

SPECIFICATION forming part of Letters Patent No. 582,845, dated May 18, 1897.

Application filed May 13, 1896. Serial No. 591,362. (No model.)

*To all whom it may concern:*

Be it known that I, FRANK P. BOLAND, a citizen of the United States, residing at Providence, in the county of Providence and State of Rhode Island, have invented certain new and useful Improvements in Detachable Dripless Strainers for Tea or Coffee Pots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention forming the subject of this application for patent relates to improvements in detachable dripless strainers for tea or coffee pots.

In strainers of the above type as heretofore devised it has been usual in some cases to provide them with comparatively large and open discharging-chambers, and in other cases a portion of the outer sides or walls of the strainer have been perforated, so that when in use, as in pouring the tea, the latter will flow directly therefrom into the cup. An objection to such former strainers is that they are more liable to become clogged and inoperative, and at the same time the tea in its passage therethrough is so spread or diffused that it forms an irregular or broken pouring.

The object I have in view is to produce a dripless strainer devoid of the above objections and one in which the cost of making is reduced to a minimum.

To that end my invention consists of a detachable teapot-strainer having essentially the form of a cone-frustum open at both ends and having imperforate walls, a transversely-arranged sieve or perforated partition dividing the strainer into two chambers, an upper one and a lower one, and having the walls of the upper chamber at one side bent inwardly to form a spout-guide, and at the same time forming a rear wall for the drip-retaining chamber when the strainer is in its normal position, the teapot then being at rest or vertical.

In the accompanying sheet of drawings, Figure 1 is a vertical central sectional view of my improved detachable dripless tea-strainer. Fig. 2 is a plan view. Fig. 3 is a side view, on a reduced scale, showing the strainer attached to the nose or spout of a teapot and corresponding to the normal position; and Fig. 4 is a similar view showing the device tipped or inclined as when the tea is being poured.

A in the drawings indicates my improved strainer as a whole, adapted to be made of any suitable material. The form of the shell or vessel proper, $a$, is substantially conical. Its apex or point end is cut away, thereby forming the small discharge-outlet $f$. The opposite or base end of the vessel is also open and provided with a bent wire terminating in two spring prongs or fingers $w$, capable of being inserted into the spout of a tea or coffee pot. The conical sides of the vessel $a$ are closed throughout and unprovided with openings. The vessel is interiorly divided transversely near its base end by a suitable sieve or perforated partition $b$, and constituting the strainer proper, thus forming two communicating chambers—viz., an upper or receiving chamber $c$ and the lower or discharging chamber $d$. At a point in the receiving-chamber contiguous to the said partition $b$ the wall thereof is bent inwardly, (see Figs. 1 and 2,) thereby forming an end wall $a'$ for the drip-retaining chamber. This last-named chamber is in reality a part of the said receiving and discharging chambers and becomes practically a receiving-chamber only when the device is attached to the spout $s$ of the teapot and resting in the normal position, substantially as shown in Fig. 3, wherein $m$ indicates, say, the level of the drip, &c., collected in the strainer A. It will be seen that the said bent wall portion $a'$ prevents the drippings thus collected from overflowing. In lieu of making the vessel $a$ perfectly cone-shaped I prefer to flatten its two opposite sides, thus making its form oblate or ellipsoidal cross-sectionally. (See Fig. 2.)

It will be apparent that in a teapot provided with my improved strainer $a$ the tea poured therefrom will flow in a small and concentrated stream into the teacup, the partition $b$ at the same time arresting any grounds or sediment and retaining it in the chamber $c$, but upon returning the device to its normal position (see Fig. 3) any drippings or seepage will be collected and held in check by means of the inwardly extending or depressed part $a'$ of the vessel, thereby preventing it from overflowing onto the cloth or table.

I claim as my invention—

The detachable dripless strainer A for tea and coffee pots, the same having a conoidal shape open at both ends and elliptical cross-sectionally, a perforated partition or sieve $b$ arranged substantially parallel with said openings thereby dividing the strainer into receiving and discharging chambers, $c$ $d$ respectively, and having one side of the receiving-chamber contiguous to the pot-nose indented to form an end retaining-wall $a'$ of the drip-retaining chamber so as to hold the tea-drippings in check when the pot is in the normal position, and a holder or attaching means, as $w$, secured to or integral with the strainer, substantially as hereinbefore described.

In testimony whereof I have affixed my signature in presence of two witnesses.

FRANK P. BOLAND.

Witnesses:
GEO. H. REMINGTON,
REMINGTON SHERMAN.